US011873077B2

United States Patent
Farouz-Fouquet

(10) Patent No.: US 11,873,077 B2
(45) Date of Patent: Jan. 16, 2024

(54) AERODYNAMIC ELEMENT, IN PARTICULAR FOR AIRCRAFT, COMPRISING TWO AERODYNAMIC PARTS FORMING AN ASCENDING PROFILE JUNCTION

(71) Applicant: Airbus SAS, Blagnac (FR)

(72) Inventor: Mathias Farouz-Fouquet, Blagnac (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 17/776,373

(22) PCT Filed: Nov. 3, 2020

(86) PCT No.: PCT/FR2020/051982
§ 371 (c)(1),
(2) Date: May 12, 2022

(87) PCT Pub. No.: WO2021/099710
PCT Pub. Date: May 27, 2021

(65) Prior Publication Data
US 2022/0396350 A1    Dec. 15, 2022

(30) Foreign Application Priority Data
Nov. 18, 2019   (FR) ........................... 1912845

(51) Int. Cl.
*B64C 21/02*    (2006.01)
(52) U.S. Cl.
CPC ................... *B64C 21/02* (2013.01)

(58) Field of Classification Search
CPC ...................................................... B64C 21/02
See application file for complete search history.

(56) References Cited

U.S. PATENT DOCUMENTS

| 4,285,482 A | 8/1981 | Lewis |
| 6,135,395 A * | 10/2000 | Collett ................... B64C 21/06 244/209 |
| 2015/0353187 A1* | 12/2015 | Smith ..................... B64C 13/36 244/214 |

FOREIGN PATENT DOCUMENTS

EP    2939921 A1    11/2015

OTHER PUBLICATIONS

International Search Report; priority document.
(Continued)

*Primary Examiner* — Brady W Frazier
*Assistant Examiner* — Shanna Danielle Glover
(74) *Attorney, Agent, or Firm* — Greer, Burns & Crain, Ltd.

(57) ABSTRACT

An aerodynamic element includes at least one first, fixed aerodynamic part including a box section that is covered at least partly by a plate with an extreme part, and one second aerodynamic part including a peripheral surface with an end and at least one holding element provided with a shoulder which forms, with the extreme part of the plate, a groove in which the end of the peripheral surface can be housed, such that the peripheral surface and the plate form a junction having an ascending profile. The presence of the groove makes it possible to obtain a continuous ascending junction with favors a laminar airstream on the upper surface of the aerodynamic element.

10 Claims, 4 Drawing Sheets

(56) References Cited

OTHER PUBLICATIONS

French Search Report; priority document.
Bruce J. Holmes et al., "Manufacturing Tolerances for Natural Laminar Flow Airframe Surfaces" NASA Langley Research Center, Hampton, VA and Kentron International, Hampton, VA; Society of Automotive Engineers, Inc. 1986.

* cited by examiner

AERODYNAMIC ELEMENT, IN PARTICULAR FOR AIRCRAFT, COMPRISING TWO AERODYNAMIC PARTS FORMING AN ASCENDING PROFILE JUNCTION

CROSS-REFERENCES TO RELATED APPLICATIONS

This application claims the benefit of the International Application No. PCT/FR2020/051982, filed on Nov. 3, 2020, and of the French patent application No. 1912845 filed on Nov. 18, 2019, the entire disclosures of which are incorporated herein by way of reference.

FIELD OF THE INVENTION

The present invention relates to an aerodynamic element, in particular for an aircraft, comprising aerodynamic parts, at least one of which is fixed, and forming a junction with an ascending profile. The present invention relates also to an aircraft comprising such an aerodynamic element.

BACKGROUND OF THE INVENTION

Although not exclusively, such an aerodynamic element can correspond to a wing of the aircraft, for example a transport airplane.

In the particular case of a so-called laminar wing of the aircraft, that is to say, a wing that makes it possible to maintain a laminar flow over a significant distance of the upper surface, the form of the section of the wing and the angle of attack are important.

More particularly, increasing the angle of attack makes it possible to prevent or retard the separation of the laminar flow on the upper surface of the wing. To achieve that, wings are known that are provided with noses having a particular form. These noses are arranged on the front of the wing and can tilt forward ("droop nose").

Also known are aircraft whose wings are provided with so-called Krueger flaps which make it possible to increase the angle of attack thereof. They are primarily arranged between the fuselage and the engines. Finally, other systems exist, such as movable slats. These slats are arranged on the leading edge of the wing of the aircraft and the deployment thereof is controlled by the pilot or pilots.

Each of these systems, when not deployed, corresponds to an aerodynamic part fixed onto the front of the wing of the aircraft. The industrial production and installation of these aerodynamic parts generate a junction with an abrupt descending staircase tread profile or a slit between the latter and the box section of the wing, that is to say, its central part. As an example, the junction between a nose (tilting or supporting Kruger flap) and the box section of the wing has a height of more or less 600 micrometers. When the aerodynamic part corresponds to a slat, the junction with the box section of the wing can have a height of approximately more or less 1.5 millimeters.

However, in order to retain a laminar flow over a maximum distance of the upper surface, the acceptable height is equal to a few tenths of millimeters in the case of an abrupt junction of positive height (the box section is higher than the aerodynamic part) and is equal to approximately 150 micrometers in the case of an abrupt junction of negative height. Thus, the abrupt profile junction height exceeds the maximum height allowing the wing to maintain a laminar flow over a significant distance of the upper surface.

Moreover, the junction between these aerodynamic parts and the box section of the wing can have a gap which promotes the generation of turbulence on the upper surface of the wing.

To mitigate these drawbacks, it is possible to complement the junction with a spinner arranged manually in order to obtain a junction between the box section and the aerodynamic part that has a continuous and smooth profile. Another possibility consists in manufacturing a wing that has a continuous, junction-free upper surface. Such solutions generate significant costs and cannot be repeated industrially.

Such solutions are not therefore fully satisfactory.

SUMMARY OF THE INVENTION

An object of the present invention is to remedy the appearance of turbulence on the upper surface with lower costs.

It relates to an aerodynamic element comprising at least one first, fixed aerodynamic part and one second aerodynamic part, the first, fixed aerodynamic part comprising a box section that is covered at least partly by a plate, and the second aerodynamic part comprising a peripheral surface, the plate comprising at least one extreme part, the peripheral surface being provided with at least one end.

According to the invention, the aerodynamic element comprises at least one holding element provided with a shoulder, the shoulder forming, with the at least one extreme part of the plate, a groove in which the at least one end of the peripheral surface can be housed, such that the peripheral surface and the plate form a junction having an ascending profile.

Thus, by virtue of the invention the presence of the groove, in which one of the aerodynamic parts is housed, makes it possible to obtain a continuous and ascending junction. Such a junction makes it possible to promote a laminar air flow on the upper surface of the aerodynamic element and avoid the appearance of turbulence without the addition of extra material.

Advantageously, the junction has a progressive ascending profile.

Preferably, the second aerodynamic part comprises a flexible sheet.

Advantageously, the at least one end of the peripheral surface has a rounded form.

Moreover, advantageously, the at least one extreme part of the plate comprises a chamfer.

In addition, according to a particular embodiment, the at least one extreme part of the plate has an at least partially rounded form.

Advantageously, the first, fixed aerodynamic part comprises a reinforcement element to which the holding element is fixed.

Moreover, according to a first embodiment, the second aerodynamic part is fixed to the reinforcement element.

Furthermore, according to second embodiment, the second aerodynamic part is movable with respect to a nose, the nose being fixed to the reinforcement element.

Preferably, according to this second embodiment, the nose comprises a plurality of guiding rails, the second aerodynamic part comprising a plurality of cylinders, each of the cylinders being configured to be able to be displaced in one of the guiding rails so as to bring the end of the peripheral surface into the groove.

Advantageously, according to this second embodiment, the holding element is incorporated into the nose.

The present invention relates also to an aircraft, in particular a transport airplane, which comprises at least one aerodynamic element as described above.

BRIEF DESCRIPTION OF THE DRAWINGS

The attached figures will give a good understanding as to how the invention can be produced. In these figures, identical references denote similar elements.

DETAILED DESCRIPTION OF THE PREFERRED EMBODIMENTS

Figure 1:
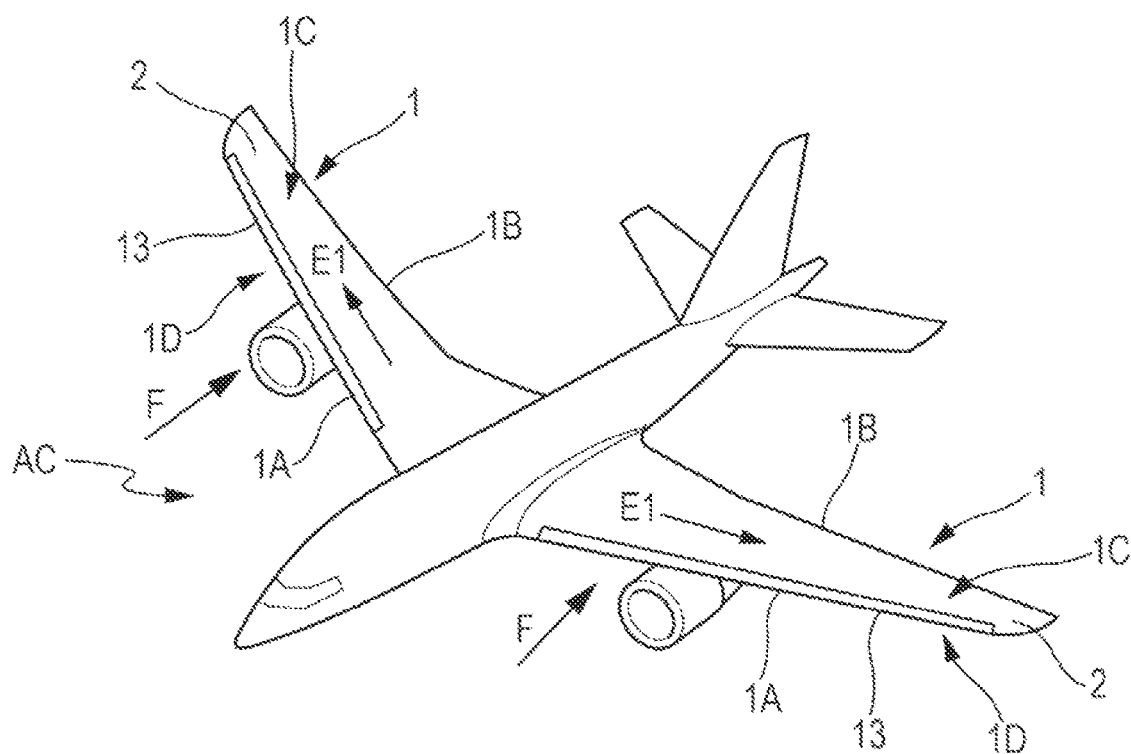
FIG. 1 is a perspective schematic view of an aircraft to which the present invention is applied.
Figure 2:
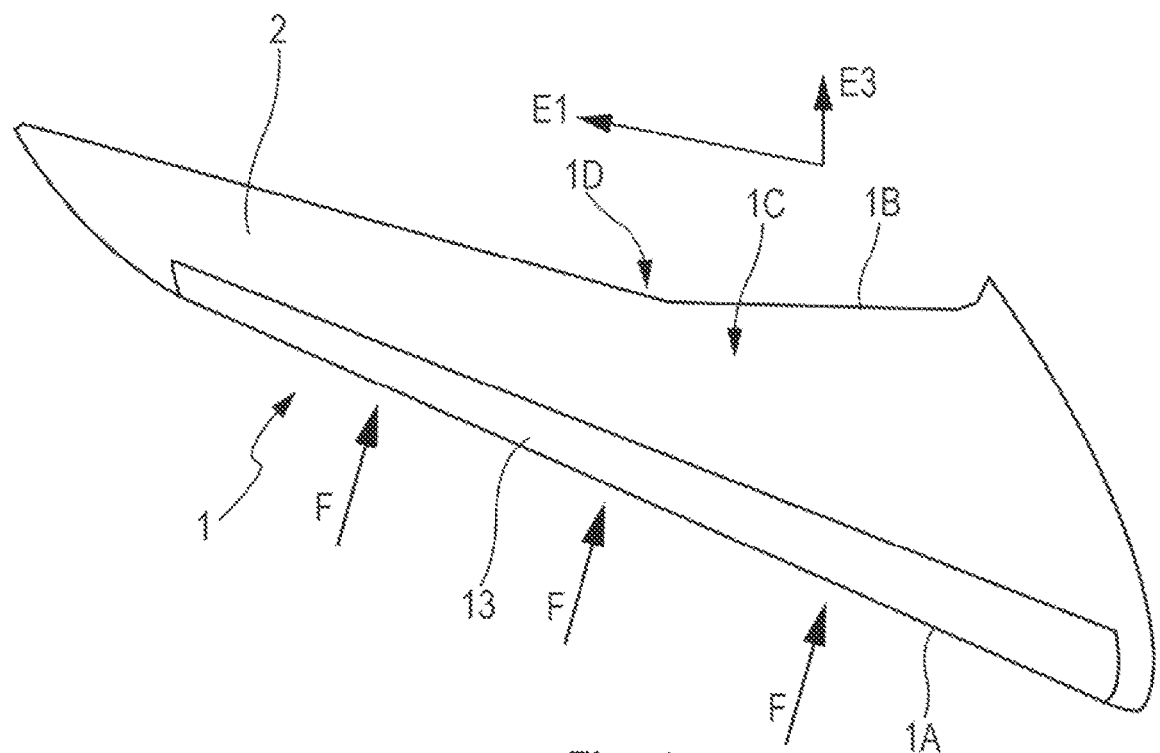
FIG. 2 schematically illustrates an aerodynamic element according to a particular embodiment of the invention, the aerodynamic element corresponding to an aircraft wing.

FIG. 1 schematically shows an aircraft AC, in particular a transport airplane, which is provided with at least one aerodynamic element 1, such as that represented in FIG. 2.

As a (nonlimiting) illustration, the aerodynamic element 1 considered hereinafter in the description corresponds to a wing of the aircraft AC over which a laminar air flow can flow as illustrated by the arrows F in FIGS. 1 and 2 which indicate the direction opposite to the direction of displacement of the aircraft AC.

To facilitate the following description, two mutually orthogonal directions are introduced. A direction E1 corresponds to the longitudinal direction in which the aerodynamic element 1 extends and is oriented in the direction going from the root to the tip of the aerodynamic element 1. A direction E2 corresponds to a radial direction with respect to the longitudinal direction E1 and is oriented from the inside to the outside of the aerodynamic element 1, the outside of the aerodynamic element 1 corresponding to the surface of the wing in contact with the air flow.

In the context of the invention, the adjective "peripheral" is defined with respect to the direction E2, towards the outside of the aerodynamic element 1. Moreover, the adjectives "front" and "rear" are defined with respect to the cord line which corresponds to a particular radial direction E2. They are defined respectively towards the leading edge 1A and towards the trailing edge 1B of the aerodynamic element 1. Furthermore, the term "height" is defined with respect to another particular radial direction E2 which is represented by a direction E3 going from the lower surface 1D to the upper surface 1C of the aerodynamic element 1.

In the example represented in FIG. 2, the aerodynamic element 1 comprises a fixed aerodynamic part 2 and an aerodynamic part 13. These two aerodynamic parts 2 and 13 can be contiguous. In such a case, the air flow circulating over the upper surface 1C and/or over the lower surface 1D of the aerodynamic element 1 encounters, at the junction, an ascending profile.

In the context of the invention, an "ascending profile" is understood to be a profile whose height increases going from the leading edge 1A to the trailing edge 1B along the cord line of the aerodynamic element 1.

Figure 3:
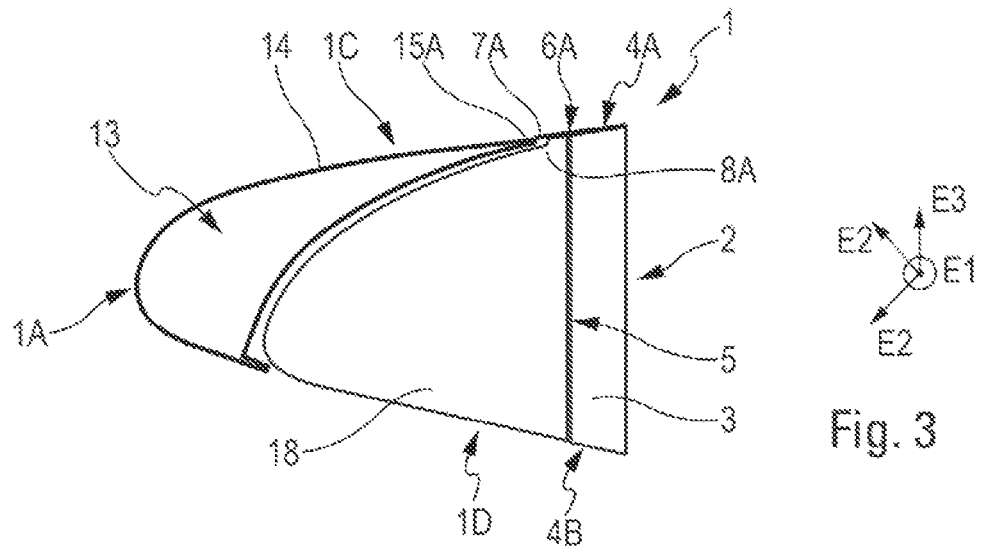
FIG. 3 is a cross-section of a front part of an aerodynamic element according to a particular embodiment of the invention.
Figure 6:
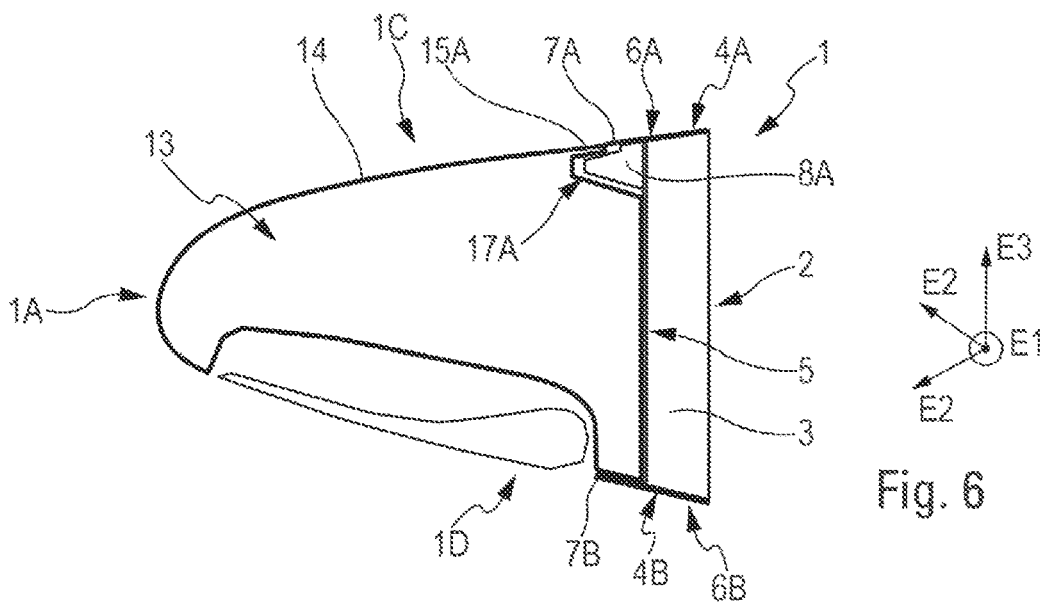
FIG. 6 illustrates a cross section of a front part of an aerodynamic element according to a particular embodiment.
Figure 7:
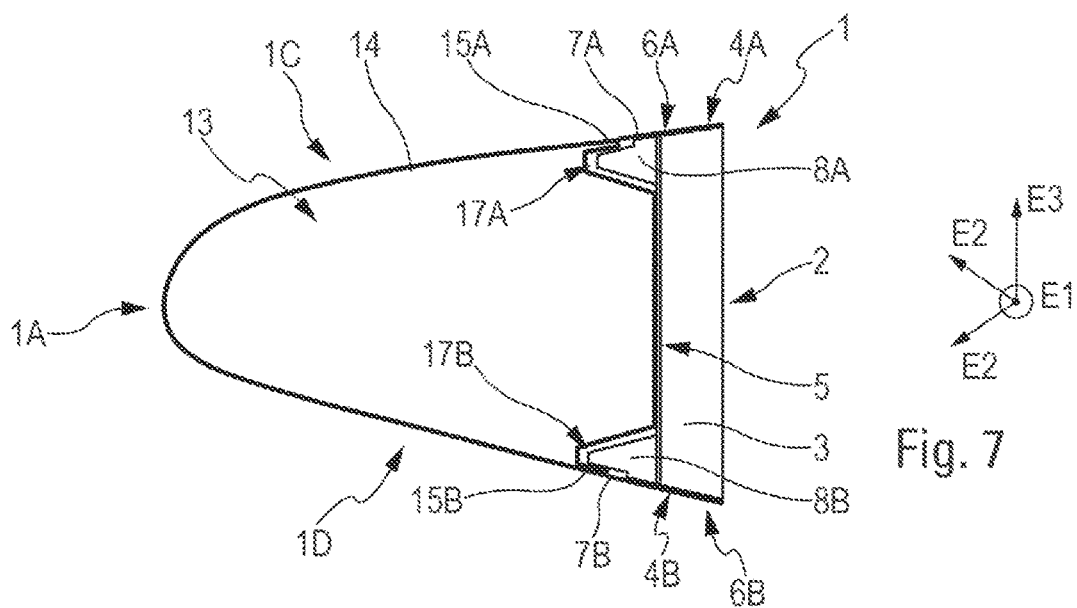
FIG. 7 illustrates a cross section of a front part of an aerodynamic element according to another embodiment of the invention.

As represented in FIGS. 3, 6 and 7 in particular, the fixed aerodynamic part 2 comprises a box section 3 which can be a central part of the aerodynamic element 1 of the aircraft AC. The box section 3 comprises two peripheral faces 4A, 4B. One of these peripheral faces 4A forms part of the upper surface 1C of the aerodynamic element 1, the other of these peripheral faces 4B forms part of the lower surface 1D of the aerodynamic element 1.

According to a preferred embodiment, the fixed aerodynamic part 2 comprises also a reinforcement element 5. This reinforcement element 5 is arranged between the two peripheral faces 4A and 4B of the box section 3 such that one of its ends is fixed to the upper surface 1C and another end is fixed to the lower surface 1D. As an example, the reinforcement element 5 is a front wing spar of the aircraft AC.

Moreover, as represented in FIGS. 3, 6 and 7 in particular, the peripheral face 4A of the box section 3 is covered by a plate 6A. Preferably, the thickness of the plate 6A is between 0.5 and 1.5 millimeters. The plate 6A comprises an extreme part 7A which extends beyond the box section 3 and the reinforcement element 5, in the forward direction towards the leading edge 1A of the aerodynamic element 1.

According to a particular embodiment, the peripheral face 4B is also covered by a plate 6B provided with an extreme part 7B. As represented in FIG. 7, the extreme part 7B extends along the lower surface 1D beyond the reinforcement element 5 in the forward direction towards the leading edge 1A of the aerodynamic element 1.

Figure 4A:
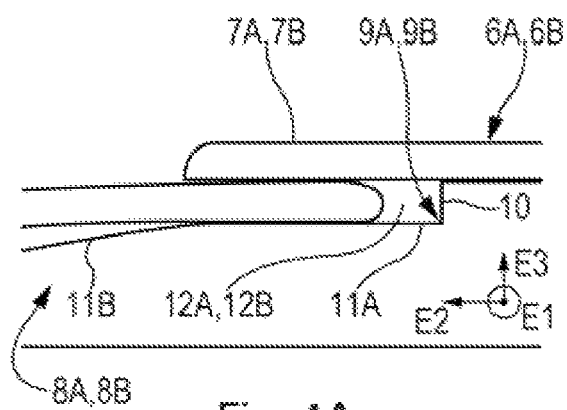
FIGS. 4A to 4D are partial, schematic and cross-sectional views of grooves according to several particular embodiments of the invention.
Figure 4B:
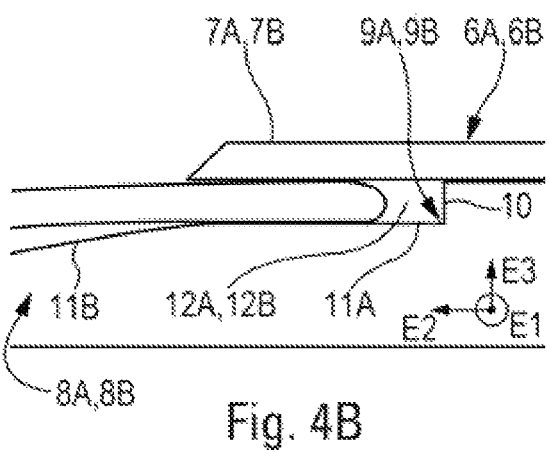
Figure 4C:
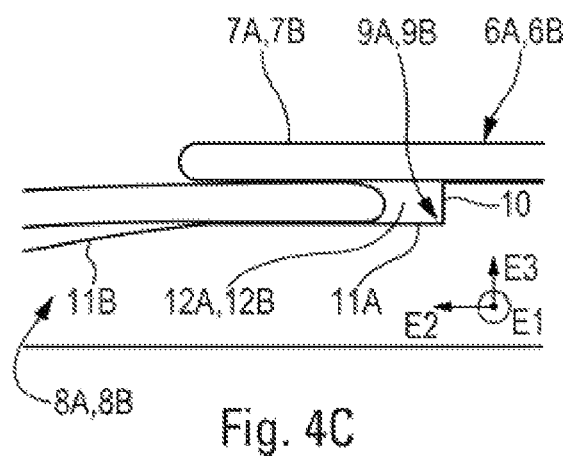

As represented in FIGS. 4A to 4D, the extreme part 7A, 7B can have different forms. According to a particular embodiment, the extreme part 7A, 7B can have a totally or partially rounded form, as represented in FIGS. 4A and 4C. When the rounded form of the extreme part 7A, 7B is partial, it can correspond to a radius of between 0.2 millimeters and 1.5 millimeters.

Figure 4D:
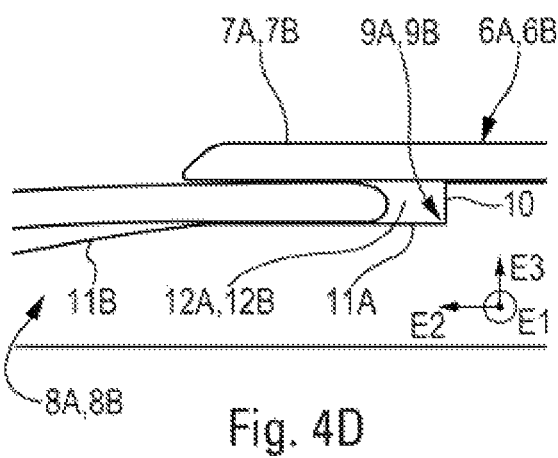

According to another embodiment, the extreme part 7A, 7B can be formed by a chamfer, as represented in FIGS. 4B and 4D. The chamfer has a non-zero angle with the radial direction E2 which is at right angles to the extreme part 7A, 7B. As an example, the angle of the chamfer can be between 15 degrees and 75 degrees. As a variant, the extreme part 7A, 7B can comprise a chamfer whose ends are rounded, as represented in FIG. 4D.

Figure 5:
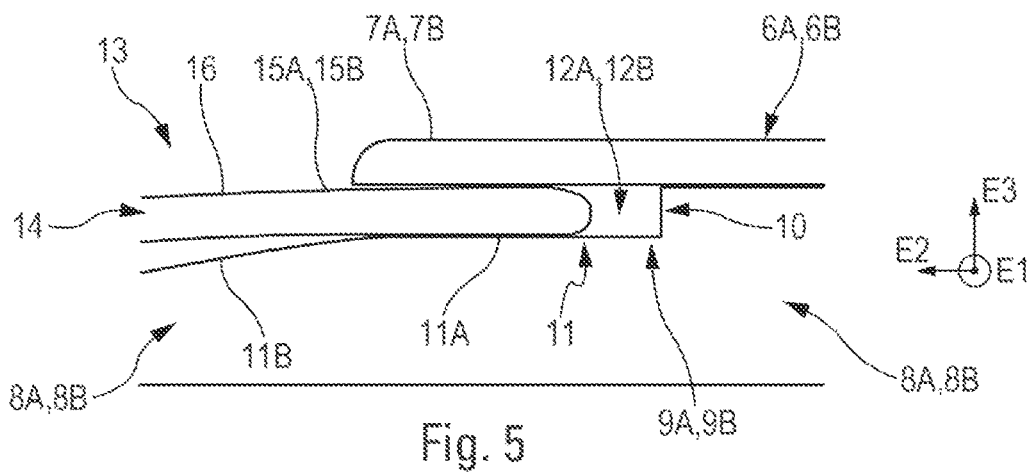
FIG. 5 represents a partial, schematic, cross-sectional view of a junction according to a particular embodiment.

Moreover, the aerodynamic element 1 comprises a holding element 8A extending along the longitudinal direction E1. The holding element 8A is fixed to one of the ends of the reinforcement element 5 so as to be arranged in proximity to the upper surface 1C. As represented in FIG. 5, the holding element 8A is provided with a shoulder 9A. The shoulder 9A is formed by an abutment 10 and a bearing surface 11. The bearing surface 11 comprises a first, flat surface 11A so as to form, with the extreme part 7A of the plate 6A, a groove 12A which extends along the longitudinal direction E1. The bearing surface 11 also comprises a ramp 11B forward of the flat surface 11A, so as to guide the access to the groove 12A.

As a variant, the aerodynamic element 1 also comprises another holding element 8B which extends along the longitudinal direction E1 and which is provided with a shoulder 9B. As represented in FIG. 6, this holding element 8B is arranged on the reinforcement element 5 in proximity to the lower surface 1D. In this variant, the box section 3 of the aerodynamic part 1 is covered by the plate 6B on the lower surface 1D so that the extreme part 7B of the plate 6B forms, with the shoulder 9B of the holding element 8B, another groove 12B extending along the longitudinal direction E1.

Moreover, the aerodynamic element 1 comprises the aerodynamic part 13. In a preferred embodiment, this aerodynamic part 13 is arranged at the front of the aerodynamic element 1. As represented in FIGS. 3, 6 and 7 in particular, the aerodynamic part 13 comprises a peripheral surface 14 which forms part of both the upper surface 1C and the lower surface 1D of the aerodynamic element 1. In a preferred embodiment, the peripheral surface 14 is provided with an end 15A extending along the direction E1 on the upper surface 1C. This end 15A is able to be housed in the groove 12A such that the peripheral surface 14 and the plate 6A form a junction whose ascending profile is continuous.

As a variant, the peripheral surface 14 also comprises an end 15B arranged on the upper surface opposite the groove 12B formed by the shoulder 9B and the extreme part 7B. When this end 15B is housed in the groove 12B, the peripheral surface 14 and the plate 6B also form a junction of continuous ascending profile.

The absence of gap between the fixed aerodynamic part 2 and the aerodynamic part 13 makes it possible to delay the appearance of turbulent air flows along the upper surface 1C of the aerodynamic element 1. As an example, the thickness of the end 15A, 15B is between 1 millimeter and 2 millimeters.

As represented in FIG. 5, the end 15A, 15B has a rounded form. The end 15A, 15B can be, by way of example, housed in the groove 12B over a distance approximately equal to 2 millimeters.

Furthermore, according to the embodiments in which the extreme part 7A, 7B of the plate 6A, 6B has a partially or totally rounded form, as well as a chamfered form, the junction between the peripheral surface 14 and the plate 6A, 6B comprises a progressive ascending profile.

In the context of the invention, a "progressive profile" is understood to be a junction profile whose height increases regularly over a certain distance. This progressive ascending profile also makes it possible to maintain a laminar flow over a maximum distance of the upper surface 1C of the aerodynamic element 1 by overcoming the constraints on the maximum height of the junction.

According to a preferred embodiment, the aerodynamic part 13 comprises a layer 16 which is flexible. This flexible layer 16 wholly or partly covers the peripheral surface 14. It covers in particular the end 15A, 15B such that this end 15A, 15B slips over the ramp 11B of the holding element 8A, 8B to be fitted into the groove 12A, 12B. The flexibility of the layer 16 makes it possible to absorb the slight deformations of the peripheral surface 14 when the end 15A, 15B is housed in the groove 12A, 12B.

As represented in FIGS. 6 and 7, in a first particular embodiment, the aerodynamic part 13 is fixed to the reinforcement element 5. Such an aerodynamic part 13 can be, for example, a nose comprising a Krueger flap (FIG. 6). The aerodynamic part 13 has a contact surface with the reinforcement element 5 and a step number 17A in which the holding element 8A is fitted. The junction between such an aerodynamic part 13 and the fixed aerodynamic part 2 is ensured by the housing 17A of the end 15A in the groove 12A.

In a variant of this first particular embodiment, the aerodynamic part 13 is a front nose fixed onto the reinforcement element 5 on which are also arranged two holding elements 8A and 8B. The fixed front nose then comprises two step numbers 17A and 17B in which a holding element 8A, 8B is fitted. As represented in FIG. 7, the peripheral surface 14 comprises the end 15A which is arranged on the upper surface 1C and the end 15B which is arranged on the lower surface 1D. Each of these ends 15A, 15B comprises the flexible sheet 16. Moreover, in this variant, the box section 3 is covered by the plate 6A, 6B at the extreme parts 7A and 7B such that the end 15A, respectively the end 15B, is housed in the groove 12A formed by the extreme part 7A and the holding element 8A, respectively in the groove 12B formed by the extreme part 7B and the holding element 8B.

In another variant of this first embodiment, the aerodynamic part 13 is a so-called morphing nose. The ends 15A and 15B of this type or morphing nose are fixed to the reinforcement element 5. The morphing nose also comprises two step numbers 17A and 17B in which a holding element 8A, 8B is fitted.

Moreover, this morphing nose is covered by a deformable skin (not represented) and comprises means arranged inside the morphing nose capable of deforming this skin.

In a second particular embodiment, the aerodynamic part 13 is movable with respect to a nose 18, this nose 18 being fixed onto the reinforcement element 5. As an example, the nose 18 represents the front of the aerodynamic element 1 and the aerodynamic part 13 represents a slat.

As represented in FIGS. 3 and 8A to 8C, in this second embodiment, the holding element 8A, 8B is incorporated into the nose 18 such that the nose 18 comprises the shoulder 9A, 9B forming the groove 12A, 12B, with the extreme part 7A, 7B of the plate 6A, 6B.

Figure 8A:
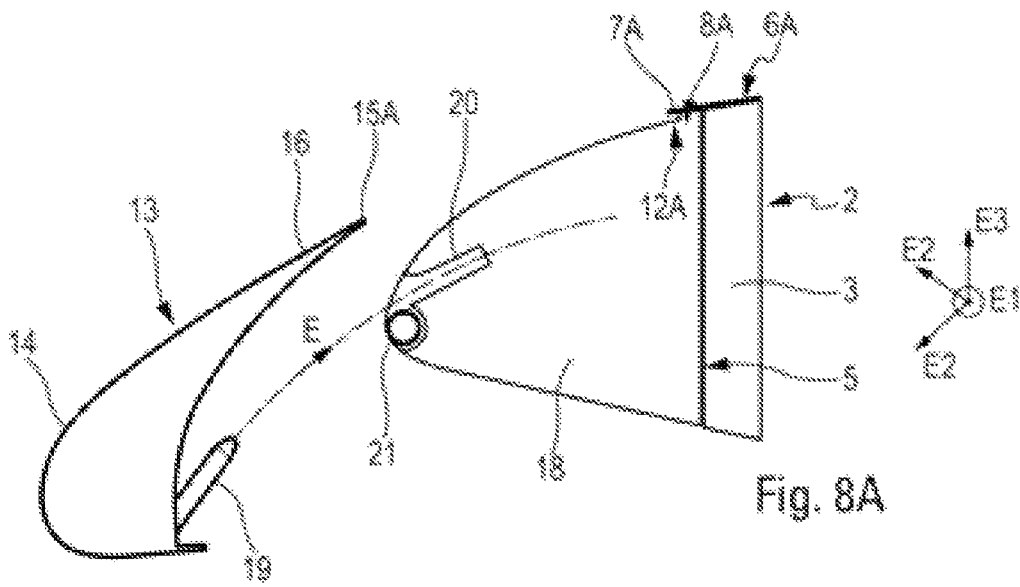
FIGS. 8A to 8C represent cross sections of a front part of an aerodynamic element in different positions according to an embodiment of the invention.

According to this second embodiment, the nose 18 comprises a plurality of guiding rails 20 and of rollers 21. The aerodynamic part 13 comprises a plurality of cylinders 19. Each of these cylinders 19 can be displaced in the direction of the arrow E in one of the guiding rails 20. The sliding of the cylinders 19 in the guiding rails 20 makes it possible to bring the end 15A of the peripheral surface 14 into the groove 12A (FIG. 8C).

An example of operation of an aerodynamic element 1 is presented hereinbelow, with reference to FIGS. 8A to 8C.

The mechanism for displacing the movable aerodynamic part 13 on the nose 18 can be controlled by the pilot or pilots of the aircraft AC. The aerodynamic part 13 can notably switch from a "slat extended" position as represented in FIG. 8A to a "slat retracted" position, as represented in FIG. 8C. In order to switch from the slat extended position to the slat retracted position, the cylinders 19 fit into the guiding rails 20. The presence of rollers 21 at the entry of the guiding rails 20 facilitates the insertion of the cylinders 19.

Figure 8B:
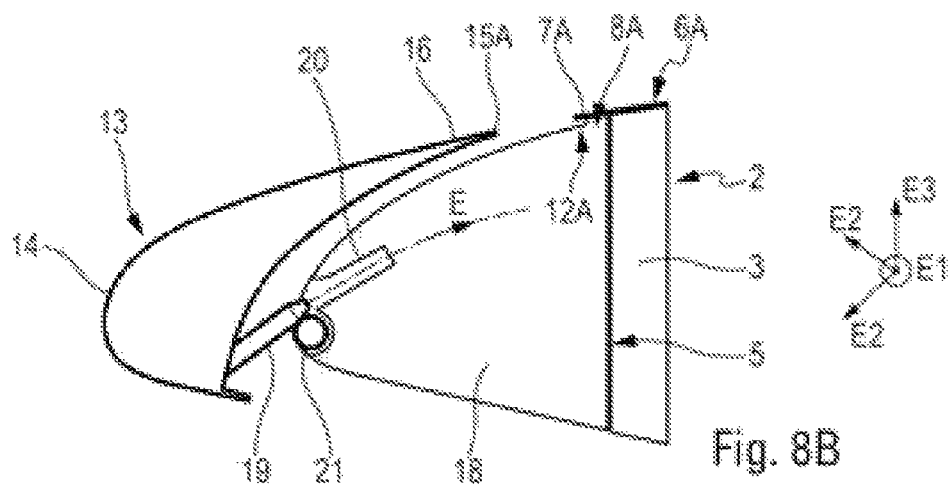
Figure 8C:
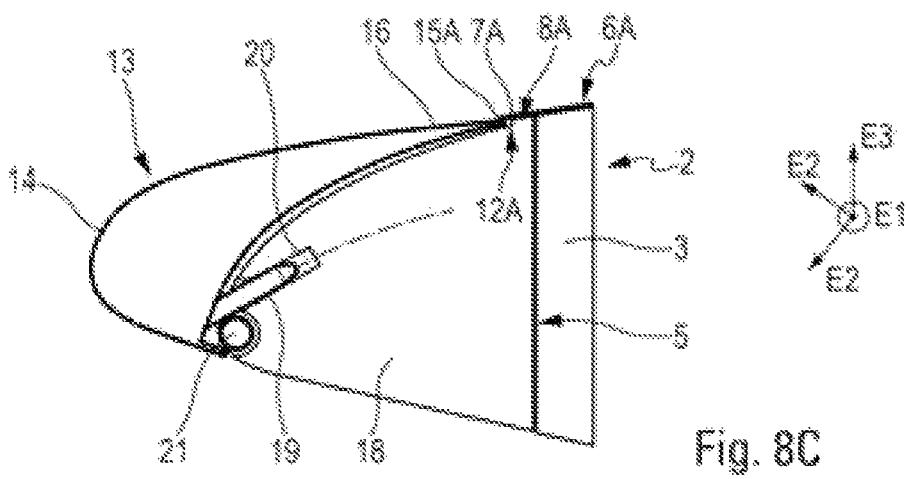

As represented in FIG. 8B, the end 15A of the peripheral surface 14 is then brought into proximity with the groove 12A. During the guiding of the cylinders 19 in the guiding rails 20, the end 15A first enters into contact with the flat surface 11B of the shoulder 9B. The flexibility of the sheet 16 which covers the peripheral surface 14 creates slight deformations of the end 15A. This flexibility makes it possible not to damage the peripheral surface 14 of the aerodynamic part 13 and/or the nose 18 as the slats are retracted or extended.

As represented in FIG. 8C, the displacement of the cylinders 19 in the guiding rails 20 to the slat retracted position brings the end 15A into contact with the flat surface 11A so as to be housed in the groove 12A. In this slat retracted position, the movable aerodynamic part 13 and the fixed aerodynamic part 2 form an ascending and continuous junction which contributes to obtaining a laminar flow on the upper surface 1C of the aerodynamic element 1.

The aerodynamic element 1, as described above, offers many advantages. In particular:
- there is no need for a spinner between the front of the wing and the box section 3 of the wing in order to obtain a continuous upper surface 1C, which constitutes a reduction in costs;
- the height of the junction formed by the aerodynamic parts 2 and 13 is compatible with the maximum height values for maintaining a laminar flow over the wing of the aircraft AC; and
- replacing the front of a damage wing does not entail replacing all of the wing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic element comprising:
    at least one first, fixed aerodynamic part, and
    one second aerodynamic part,
        said first, fixed aerodynamic part comprising a box section covered at least partly by a plate, said plate comprising at least one extreme part, and
        said second aerodynamic part comprising a peripheral surface,
            said peripheral surface being provided with at least one end, and
            at least one holding element provided with a shoulder, said shoulder forming, with said at least one extreme part of said plate, a groove in which said at least one end of said peripheral surface is removably housed, such that said peripheral surface and said plate form a junction having an ascending profile, wherein said at least one extreme part is disposed above said at least one end and said shoulder when said at least one extreme part is housed in said groove.

2. The aerodynamic element according to claim 1, wherein the junction has a progressive ascending profile.

3. The aerodynamic element according to claim 1, wherein the second aerodynamic part comprises a flexible sheet.

4. The aerodynamic element according to claim 1, wherein said at least one end of said peripheral surface has a rounded form.

5. The aerodynamic element according to claim 1, wherein said at least one extreme part of said plate has an at least partially rounded form.

6. The aerodynamic element according to claim 1, wherein the second aerodynamic part is movable with respect to a nose.

7. The aerodynamic element according to claim 6, wherein said nose comprises a plurality of guiding rails, the second aerodynamic part comprising a plurality of cylinders, each of said cylinders being configured to be able to be displaced in one of said guiding rails so as to bring said end of said peripheral surface into said groove.

8. The aerodynamic element according to claim 6, wherein said holding element is incorporated into said nose.

9. An aircraft comprising at least one aerodynamic element according to claim 1.

10. The aerodynamic element according to claim 1, wherein said groove forms a cavity which receives said at least one end, such that said at least one extreme part of said plate is an upper portion of said cavity and said shoulder is a lower portion of said cavity, wherein said at least one end of said peripheral surface is surrounded by said groove.

* * * * *